US011629219B2

(12) United States Patent
Napoli et al.

(10) Patent No.: US 11,629,219 B2
(45) Date of Patent: Apr. 18, 2023

(54) LATENT CURING ACCELERATORS

(71) Applicant: Huntsman Advanced Materials Licensing (Switzerland) GMBH, Basel (CH)

(72) Inventors: Alessandro Napoli, Allschwil (CH); Amit Nagarkar, Basel (CH); Kenneth Black Scobbie, Basel (CH); Susanne Elmer, Basel (CH)

(73) Assignee: HUNTSMAN ADVANCED MATERIALS LICENSING (Switzerland) GmbH, Badel (CH)

( * ) Notice: Subject to any disclaimer, the term of this patent is extended or adjusted under 35 U.S.C. 154(b) by 0 days.

(21) Appl. No.: 16/471,594

(22) PCT Filed: Dec. 21, 2017

(86) PCT No.: PCT/US2017/067925
§ 371 (c)(1),
(2) Date: Jun. 20, 2019

(87) PCT Pub. No.: WO2018/119250
PCT Pub. Date: Jun. 28, 2018

(65) Prior Publication Data
US 2020/0223977 A1 Jul. 16, 2020

(30) Foreign Application Priority Data

Dec. 21, 2016 (EP) .................... 16205610

(51) Int. Cl.
| C08G 59/68 | (2006.01) |
| C08G 59/72 | (2006.01) |
| C08G 59/40 | (2006.01) |
| C08L 63/00 | (2006.01) |
| C08L 63/02 | (2006.01) |
| C09D 163/00 | (2006.01) |
| C09D 163/02 | (2006.01) |
| C09J 163/00 | (2006.01) |
| C09J 163/02 | (2006.01) |
| C08G 59/24 | (2006.01) |
| C08G 59/32 | (2006.01) |

(52) U.S. Cl.
CPC ....... *C08G 59/245* (2013.01); *C08G 59/3227* (2013.01); *C08G 59/4021* (2013.01); *C08G 59/686* (2013.01); *C08G 59/72* (2013.01); *C09D 163/00* (2013.01); *C09J 163/00* (2013.01)

(58) Field of Classification Search
None
See application file for complete search history.

(56) References Cited

U.S. PATENT DOCUMENTS

| 3,622,540 A | | 11/1971 | Hashimoto et al. | |
| 4,202,920 A | * | 5/1980 | Renner | C08G 59/4014 427/386 |
| 4,283,520 A | | 8/1981 | Moser et al. | |
| 4,528,357 A | | 7/1985 | Renner | |
| 4,562,241 A | | 12/1985 | Renner | |
| 4,701,378 A | * | 10/1987 | Bagga | C08G 59/68 156/330 |
| 4,900,801 A | * | 2/1990 | Takata | C08G 59/245 528/87 |
| 4,933,422 A | * | 6/1990 | Hammer | C08G 59/686 548/335.1 |
| 5,219,958 A | * | 6/1993 | Noomen | C08K 5/3442 525/445 |

(Continued)

FOREIGN PATENT DOCUMENTS

| EP | 0621295 A2 | 3/1999 |
| GB | 2010846 A | 7/1979 |

(Continued)

*Primary Examiner* — Michael J Feely

(57) ABSTRACT

A curable composition comprising (A) an epoxy resin containing on average more than one epoxy group per molecule; (B) a compound of formula A[—X—CO—CH$_2$—CN]$_n$(1), wherein A is hydrogen or $C_1$-$C_{12}$ alkyl which is unsubstituted or substituted by one or more $C_1$-$C_{12}$ alkoxy groups, $C_1$-$C_{12}$ alkylcarbonyl groups, $C_7$-$C_{25}$ arylcarbonyl groups, hydroxyl groups, amino groups, $C_1$-$C_{12}$ alkylamino groups, $C_1$-$C_{12}$ dialkylamino groups, cyano groups or halogen atoms, or A is a bivalent aliphatic, cycloaliphatic, aromatic, araliphatic or heterocyclic organic radical, X denotes —O— or —NR$_1$—, wherein R$_1$ is hydrogen or $C_1$-$C_{12}$ alkyl which is unsubstituted or substituted by one or more $C_1$-$C_{12}$ alkoxy groups, $C_1$-$C_{12}$ alkylcarbonyl groups, $C_7$-$C_{25}$ arylcarbonyl groups, hydroxyl groups, amino groups, $C_1$-$C_{12}$ alkylamino groups, $C_1$-$C_{12}$ dialkylamino groups, cyano groups or halogen atoms, n is 1 or 2; and (C) a protected base in the form of an adduct or salt which is able to release a basic compound upon heating to a temperature greater than 70° C., is storage-stable, allows processing over a longer period of time (pot-life) and produces cured products having outstanding mechanical and thermal properties.

10 Claims, No Drawings

(56) References Cited

U.S. PATENT DOCUMENTS

| | | | |
|---|---|---|---|
| 2003/0131937 A1* | 7/2003 | Konarski | C08L 63/00 |
| | | | 156/330 |
| 2007/0066721 A1 | 3/2007 | Kramer et al. | |
| 2007/0100114 A1 | 5/2007 | Weidmann | |
| 2013/0131216 A1 | 5/2013 | Sakane | |
| 2015/0051315 A1 | 2/2015 | Wang et al. | |
| 2015/0065606 A1 | 3/2015 | Matsuda et al. | |

FOREIGN PATENT DOCUMENTS

| | | | | |
|---|---|---|---|---|
| GB | 2052513 A | | 1/1981 | |
| JP | 04222879 A | * | 8/1992 | C08F 299/00 |
| JP | 63-236726 | | 1/1994 | |

* cited by examiner

LATENT CURING ACCELERATORS

CROSS REFERENCE TO RELATED APPLICATIONS

This application claims the benefit of European Patent Application Serial Number 16205610.5, filed Dec. 21, 2016, the entire disclosure of which is incorporated herein by reference.

STATEMENT REGARDING FEDERALLY SPONSORED RESEARCH OR DEVELOPMENT

Not applicable

FIELD OF INVENTION

The present disclosure relates to a storage-stable one-component epoxy resin composition containing a cyanoacetic acid derivative as curing agent and a protected base in the form of a salt or adduct as curing initiator One-component (1K) epoxy resin compositions (1K-systems) consisting of an epoxy resin, a curing agent and, optionally, a curing accelerator allow for a long pot-life in combination with a short curing time at high temperature.

Customary 1K epoxy resin compositions can contain solid amines like dicyandiamide or diaminodiphenylsulfone as curing agents. The solid state and associated particle size of said curing agents can be a limitation for certain manufacturing processes (e.g. in fiber-reinforced composite materials). Furthermore, these mixtures require low-temperature storage (−18° C. to +8° C.).

Other approaches to stable 1K epoxy resin compositions may use accelerators such as imidazoles, boron trihalogenide amine complexes or cationic initiators for epoxy homopolymerization. Cured materials using such mechanisms typically suffer from brittleness and associated poor mechanical properties requiring additives and formulation to compensate for property degradation.

U.S. Pat. No. 4,283,520 suggests using cyanoacetic acid derivatives as curing agents in combination with phenol urea derivatives as curing accelerators. These epoxy resin compositions exhibit high storage stability and provide cured products having good toughness properties, but the pot-life is not sufficient for all applications. Moreover the achieved storage stability is strictly dependent on the concentration of the curing accelerators making the balance between stability and reactivity difficult to achieve. As a result more stable compositions tend to react very slowly at moderate curing temperatures (less than 120° C.) or require higher temperatures to cure at acceptable times.

BACKGROUND

The problem underlying the present disclosure is accordingly improving the storage stability of epoxy resin compositions without sacrificing cure time at processing conditions. We have surprisingly found that providing protected base catalysts unexpectedly results in storage-stable 1K epoxy resin compositions which allow processing over a longer period of time (pot-life) and rapidly produce cured products having outstanding mechanical and thermal properties. This disclosure proposes a system for obtaining different reactivities in an epoxy based composition by carefully selecting the acid to form a salt with a base or adducting the base with a protecting group. The base is then activated by heating the composition to a pre-defined temperature. Such temperature depends on the protection mechanism used.

SUMMARY

The present disclosure relates to a curable composition comprising
(A) an epoxy resin containing on average more than one epoxy group per molecule;
(B) a compound of formula

(i) $A[-X-CO-CH_2-CN]_n$     (1), wherein A is hydrogen or $C_1$-$C_{12}$ alkyl which is unsubstituted or substituted by one or more $C_1$-$C_{12}$ alkoxy groups, $C_1$-$C_{12}$ alkylcarbonyl groups, $C_7$-$C_{25}$ arylcarbonyl groups, hydroxyl groups, amino groups, $C_1$-$C_{12}$ alkylamino groups, $C_1$-$C_{12}$ dialkylamino groups, cyano groups or halogen atoms, or
A is a bivalent aliphatic, cycloaliphatic, aromatic, araliphatic or heterocyclic organic radical, X denotes —O— or $NR_1$—wherein $R_1$ is hydrogen or $C_1$-$C_{12}$ alkyl which is unsubstituted or substituted by one or more $C_1$-$C_{12}$ alkoxy groups, $C_1$-$C_{12}$ alkylcarbonyl groups, $C_7$-$C_{25}$ arylcarbonyl groups, hydroxyl groups, amino groups, $C_1$-$C_{12}$alkylamino groups, $C_1$-$C_{12}$ dialkylamino groups, cyano groups or halogen atoms, n is 1 or 2, and
(C) a protected base in the form of an adduct or salt which is able to release a basic compound upon heating to a temperature greater than 70° C.

DETAILED DESCRIPTION

Epoxy resins suitable as component (A) are those customary in epoxy resin technology. Examples of epoxy resins suitable as component (A) are:

I) Polyglycidyl and poly(β-methylglycidyl) esters, obtainable by reaction of a compound having at least two carboxyl groups in the molecule with epichlorohydrin and β-methylepichlorohydrin, respectively. The reaction is preferably performed in the presence of bases.

Aliphatic polycarboxylic acids may be used as the compound having at least two carboxyl groups in the molecule. Examples of such polycarboxylic acids are oxalic acid, succinic acid, glutaric acid, adipic acid, pimelic acid, suberic acid, azelaic acid or dimerised or trimerised linoleic acid.

It is also possible, however, to use cycloaliphatic polycarboxylic acids, for example hexahydrophthalic acid or 4-methylhexahydrophthalic acid.

Aromatic polycarboxylic acids, for example phthalic acid, isophthalic acid or terephthalic acid, may also be used as well as partly hydrogenated aromatic polycarboxylic acids such as tetrahydrophthalic acid or 4-methyltetrahydrophthalic acid.

II) Polyglycidyl or poly(β-methylglycidyl) ethers, obtainable by reaction of a compound having at least two free alcoholic hydroxy groups and/or phenolic hydroxy groups with epichlorohydrin or β-methylepichlorohydrin under alkaline conditions or in the presence of an acid catalyst with subsequent alkali treatment.

The glycidyl ethers of this kind are derived, for example, from acyclic alcohols, e.g. from ethylene glycol, diethylene glycol or higher poly(oxyethylene) glycols, propane-1,2-diol or poly(oxypropylene) glycols, propane-1,3-diol, butane-1,4-diol, poly(oxytetramethylene) glycols, pentane- 1,5-diol, hexane-1,6-diol, hexane-2,4,6-triol, glycerol, 1,1,1-trimethylol-propane, pentaerythritol, sorbitol, and also from polyepichlorohydrins.

Further glycidyl ethers of this kind are derived from cycloaliphatic alcohols, such as 1,4-cyclohexanedimethanol, bis(4-hydroxycyclohexyl) methane or 2,2-bis(4-hydroxycyclo-hexyl)propane, or from alcohols that contain aromatic groups and/or further functional groups, such as N,N-bis(2-hydroxyethyl)aniline or p,p'-bis(2-hydroxyethylamino)diphenylmethane. The glycidyl ethers can also be based on mononuclear phenols, for example resorcinol or hydroquinone, or on polynuclear phenols, for example bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane or 2,2-bis(3,5-dibromo-4-hydroxyphenyl) propane.

Further hydroxy compounds that are suitable for the preparation of glycidyl ethers are novolacs, obtainable by condensation of aldehydes, such as formaldehyde, acetaldehyde, chloral or furfuraldehyde, with phenols or bisphenols that are unsubstituted or substituted by chlorine atoms or by $C_1$-$C_9$ alkyl groups, e.g. phenol, 4-chlorophenol, 2-methylphenol or 4-tert-butylphenol.

III) Poly(N-glycidyl) compounds, obtainable by dehydrochlorination of the reaction products of epichlorohydrin with amines containing at least two amine hydrogen atoms. Such amines are, for example, aniline, n-butylamine, bis(4-aminophenyl)methane, m-xylylenediamine or bis(4-methylaminophenyl)methane.

The poly(N-glycidyl) compounds also include, however, triglycidyl isocyanurate, N,N'-diglycidyl derivatives of cycloalkyleneureas, such as ethyleneurea or 1,3-propyleneurea, and diglycidyl derivatives of hydantoins, such as of 5,5-dimethylhydantoin.

IV) Poly(S-glycidyl) compounds, for example di-S-glycidyl derivatives, derived from dithiols, e.g. ethane-1,2-dithiol or bis(4-mercaptomethylphenyl)ether.

V) Cycloaliphatic epoxy resins, e.g. bis(2,3-epoxycyclopentyl)ether, 2,3-epoxycyclopentylglycidyl ether, 1,2-bis(2,3-epoxycyclopentyloxy) ethane or 3,4-epoxycyclohexylmethyl-3',4'-epoxycyclohexanecarboxylate.

It is also possible, however, to use epoxy resins wherein the 1,2-epoxy groups are bonded to different hetero atoms or functional groups. Such compounds include, for example, the N,N,O-triglycidyl derivative of 4-aminophenol, the glycidyl ether glycidyl ester of salicylic acid, N-glycidyl-N'-(2-glycidyloxypropyl)-5,5-dimethylhydantoin and 2-glycidyloxy-1,3-bis(5,5-dimethyl-1-glycidylhydantoin-3-yl) propane.

The term "cycloaliphatic epoxy resin" in the context of this disclosure denotes any epoxy resin having cycloaliphatic structural units, i.e., including both cycloaliphatic glycidyl compounds and β-methylglycidyl compounds as well as any epoxy resin based on cycloalkylene oxides. "Liquid at room temperature (RT)" is to be understood as meaning pourable compounds that are liquid at 25° C., i.e., are of low to medium viscosity (viscosity less than about 20 000 mPa·s determined with a Rheomat equipment, type 115; MS DIN 125; D=11/s at 25° C.).

Suitable cycloaliphatic glycidyl compounds and β-methylglycidyl compounds are the glycidyl esters and β-methylglycidyl esters of cycloaliphatic polycarboxylic acids, such as tetrahydrophthalic acid, 4-methyltetrahydrophthalic acid, hexahydrophthalic acid, 3-methylhexahydrophthalic acid and 4-methylhexahydrophthalic acid.

Further suitable cycloaliphatic epoxy resins are the diglycidyl ethers and β-methylglycidyl ethers of cycloaliphatic alcohols, such as 1,2-dihydroxycyclohexane, 1,3-dihydroxycyclohexane and 1,4-dihydroxycyclohexane, 1,4-cyclohexanedimethanol, 1,1-bis(hydroxymethyl)cyclohex-3-ene, bis(4-hydroxycyclohexyl)methane, 2,2-bis(4-hydroxycyclohexyl)propane and bis(4-hydroxycyclohexyl) sulfone.

Examples of epoxy resins having cycloalkylene oxide structures are bis(2,3-epoxycyclopentyl)ether, 2,3-epoxycyclopentylglycidyl ether, 1,2-bis(2,3-epoxycyclopentyl)ethane, vinyl cyclohexene dioxide, 3,4-epoxycyclohexylmethyl 3',4'-epoxycyclohexanecarboxylate, 3,4-epoxy-6-methylcyclohexylmethyl-3',4'-epoxy-6'-methylcyclohexanecarboxylate, bis(3,4-epoxycyclohexylmethyl)adipate and bis(3,4-epoxy-6-methylcyclohexylmethyl)adipate.

Preferred cycloaliphatic epoxy resins are bis(4-hydroxycyclohexyl)methanediglycidyl ether, 2,2-bis(4-hydroxycyclohexyl)propanediglycidyl ether, tetrahydrophthalic acid diglycidyl ester, 4-methyltetrahydrophthalic acid diglycidyl ester, 4-methylhexahydrophthalic acid diglycidyl ester, 3,4-epoxycyclohexylmethyl 3',4'-epoxycyclohexanecarboxylate and especially hexahydrophthalic acid diglycidyl ester.

Aliphatic epoxy resins can also be used as component (A). As "aliphatic epoxy resins" it is possible to use epoxidation products of unsaturated fatty acid esters. It is preferable to use epoxy-containing compounds derived from mono-and poly-fatty acids having from 12 to 22 carbon atoms and an iodine number of from 30 to 400, for example lauroleic acid, myristoleic acid, palmitoleic acid, oleic acid, gadoleic acid, erucic acid, ricinoleic acid, linoleic acid, linolenic acid, elaidic acid, licanic acid, arachidonic acid and clupanodonic acid.

For example, the epoxidation products of the following are suitable: soybean oil, linseed oil, perilla oil, tung oil, oiticica oil, safflower oil, poppyseed oil, hemp oil, cottonseed oil, sunflower oil, rapeseed oil, polyunsaturated triglycerides, triglycerides from euphorbia plants, groundnut oil, olive oil, olive kernel oil, almond oil, kapok oil, hazelnut oil, apricot kernel oil, beechnut oil, lupin oil, maize oil, sesame oil, grapeseed oil, lallemantia oil, castor oil, herring oil, sardine oil, menhaden oil, whale oil, tall oil and derivatives thereof.

Also suitable are higher unsaturated derivatives that can be obtained by subsequent dehydrogenation reactions of those oils.

The olefinic double bonds of the unsaturated fatty acid radicals of the above-mentioned compounds can be epoxidised in accordance with known methods, for example by reaction with hydrogen peroxide, optionally in the presence of a catalyst, an alkyl hydroperoxide or a peracid, for example performic acid or peracetic acid. Within the scope of this disclosure, both the fully epoxidised oils and the partially epoxidised derivatives that still contain free double bonds can be used for component (A).

Mixtures of epoxy resins I) to V) mentioned above can also be used. Component (A) preferably comprises an aromatic or cycloaliphatic glycidylether or glycidylester that is liquid or solid at 25° C., preferably the diglycidylether or diglycidylester of bisphenol A or bisphenol F. Preferred epoxy resins can also be obtained by the reaction of polyglycidylether and polyglycidylester with alcohols, such as diols. The reaction with diols increases the molecular weight.

Especially preferred is an epoxy resin which is a bisphenol A glycidylether which is reacted with less than an equimolar amount of bisphenol A.

According to a preferred embodiment, the composition according to the invention comprises as component (A) a bisphenol A diglycidylether or N,N,N',N'-tetraglycidyl-4,4'-diaminodiphenylmethane.

If an N-glycidyl compound like N,N,N',N'-tetraglycidyl-4,4'-diaminodiphenylmethane is used as component (A), it is not necessary to add a protected base as component (C) because the N-glycidyl compound is sufficiently alkaline to deprotonate the cyanoacetic acid derivative and thus to initiate the curing reaction. However, addition of a component (C) to the above mixture can significantly lower the curing temperature and time without affecting the storage stability.

Cyanoacetic acid derivatives suitable as component (B) are described, for example, in U.S. Pat. No. 4,283,520, which is incorporated herein by reference.

Component (B) may be a compound of formula $$A[-X-CO-CH_2-CN]_n \qquad (1)$$

A in formula (1) as a monovalent radical can be, for example, hydrogen methyl, ethyl, n-propyl, isopropyl, n-butyl, isobutyl, sec-butyl, tert-butyl, n-pentyl, neopentyl, n-hexyl, isooctyl, benzyl, 3-(dimethylamino)propyl, 3-(diethylamino)propyl, di-n-butylamino, N-morpholino or phenylamino.

A in formula (1) as a bivalent radical can be, for example, ethylene, propylene, tetram ethylene, hexamethylene, 2,2-dimethylpropanediyl, 1,3-cyclohexylene, 1,4-cyclohexylene, 1,3-cyclohexylenedimethylene, 1,4-cyclohexylenedimethylene, m-phenylene, p-phenylene, or a radical of the following formulae:

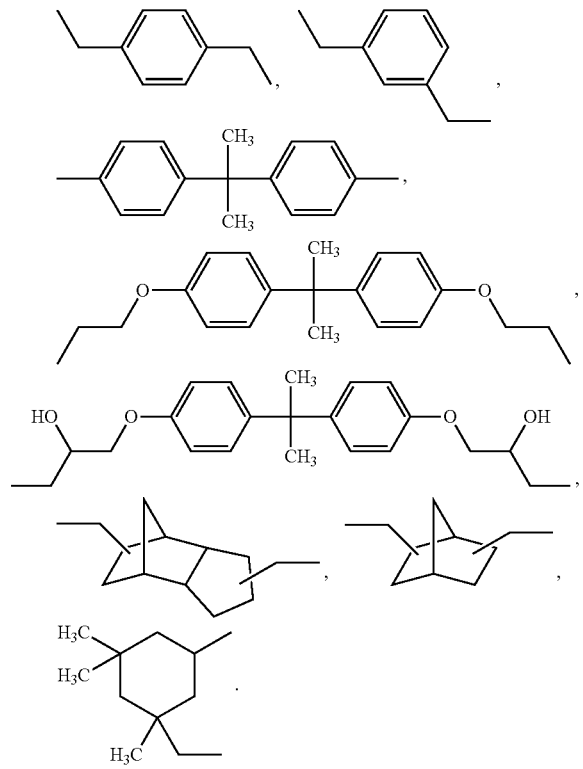

Preferred as component (B) are compounds of formula (1), wherein A represents 3-dimethylaminopropyl, hexamethylene, cyclohexane-1,3-diyl, m-phenylene or a group of the formulae

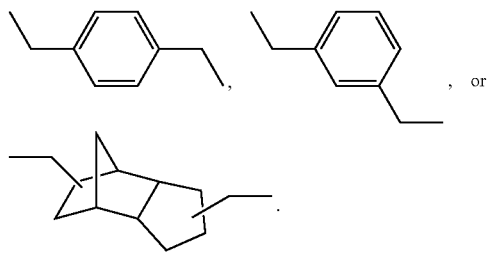

Component (C) is a "protected base". The term "protected bases" as used herein refers to all salts or adducts of basic or nucleophilic compounds which upon heating release the free reactive basic or nucleophilic compound that is capable of deprotonating the cyanoacetic acid derivative thus reacting with the oxirane ring of the epoxide (A) and initiating the curing reaction. Starting compounds for the preparation of component (C) may be, for example, aliphatic, araliphatic, aromatic or heterocyclic amines, guanidines and N-heterocyclic compounds which exhibit a $pK_a$-value of conjugated acid greater than 7.5 (in acetonitrile), preferably greater than 8.0, more preferably greater than 8.5, and in particular greater than 9.5, and which can be reversibly blocked by addition of a Bronsted or Lewis acid or an epoxide.

It is essential that upon heating to temperatures greater than 70° C., preferably greater than 85° C., and more preferably greater than 100° C., the blocking is reversed and a compound is released which is basic enough to deprotonate the cyanoacetic acid derivative thus reacting with the oxirane ring of the epoxide molecule and initiating the curing reaction.

Examples of such compounds are aliphatic amines such as ethylamine or dimethyloctylamine, urones such as N'-(4-chlorophenyl)-N,N-dimethylurea and N'-(3,4-dichlorophenyl)-N,N-dimethylurea, guanidines such as dicyandiamide and didyandiamide/imidazoline salts, imidazoles such as 1-methylimidazole and 1-methyl-3-ethylimidazole and amidines such as 1,8-diazabicycloundec-7-ene (DBU).

Further examples of compounds which can be used as component (C) are alkali alkoxides and alkali phenolates.

In a preferred embodiment the curable compositions contain as component (C) a urea derivative or an adduct or salt of an imidazole or amidine derivative.

Particularly preferred as component (C) are adducts or salts of 1-methyl-3-ethylimidazole, 1,8-diazabicycloundec-7-ene (DBU) or 1,5-Diazabicyclo[4.3.0]non-5-ene (DBN).

Blocking agents which reduce the alkalinity of the organic nitrogen-containing compounds and which are released again at temperatures greater than 70° C. are Bronsted or Lewis acids or epoxides.

Examples of Bronsted acids suitable as blocking agents are phenols such as phenol, o-, m- and p-cresol, bisphenol A and bisphenol F, and carboxylic acids such as acetic acid, 2-ethylhexanoic acid, salicylic acid, trimellitic acid and ethylenediaminetetraacetic acid (EDTA).

Instead of the free acids, the corresponding anhydrides, for example, trimellitic anhydride, can be applied as well.

Suitable Lewis acids such as boron trihalogenides, preferably $BF_3$ and $BCl_3$, may be used.

Preferably, the curable composition according to this disclosure comprises as component (C) a phenol salt, a carboxylic acid salt, an epoxide adduct or a boron trihalide adduct of an organic nitrogen-containing compound.

Particularly preferred are curable compositions comprising as component (C) a salt of acetic acid, 2-ethylhexanoic acid, ethylenediaminetetraacetic acid, salicylic acid, trimellitic acid or a boron trifluoride or trichloride-adduct.

Furthermore, curable compositions are preferred comprising as component (C) a urea derivative or an adduct or salt of an imidazole or amidine derivative.

More preferably, the curable composition according to the invention comprises as component (C) an adduct or salt of 1-methyl-3-ethylimidazole or 1,8-diazabicycloundec-7-ene.

Examples of suitable components (C) are: imidazole salts such as 1-methylimidazole/acetic acid, 1-methylimidazole/2-ethylhexanoic acid and 1H-Imidazolium, 3-ethyl-1-methyl-, salt with N-cyanocyanamide (1:1); anidine salts such as DBU/phenol, DBU/m-cresol, DBU/o-cresol, DBU/p-cresol, DBU/acetic acid, DBU/trifluoroacetic acid, DBU/2-ethylhexanoic acid, DBU/EDTA and DBU/trimellitic acid; and amidine/boron trihalogenide adducts such as DBU/$BF_3$.

Particularly preferred components (C) are DBU/phenol, DBU/acetic acid, DBU/$BF_3$, and 1H-Imidazolium, 3-ethyl-1-methyl-, salt with N-cyanocyanamide (1:1).

Component (A) and component (B) are preferably used in about equivalent amounts, i.e. based on acidic methylene hydrogen atoms and active hydrogen atoms bound to amino nitrogen atoms in the compound of formula (1) and reactive epoxy groups. However, it is also possible to use the epoxy component or the hardener in more or less than the equivalent amount. The amounts used depend on the desired final properties of the reaction product as known by the skilled persons in the art.

Preferably, the curable compositions according to this disclosure contain components (A) and (B) in such amounts that 0.1-1.0 mol, more preferably 0.2-0.8 mol, and more preferably 0.25-0.45 mol, —CO—$CH_2$—CN groups per mol epoxy groups.

The amount of component (C) in the curable compositions is preferably 0.001-0.1 mol, more preferably 0.005-0.05 mol, and more preferably 0.01-0.04 mol, per mol epoxy groups.

The compositions according to this disclosure can be prepared by mixing the individual components at room temperature or at slightly elevated temperatures, if necessary by means of suitable mills, e.g. ball mills or pin mills, kneaders or mixers.

The mixtures are extraordinarily storage-stable, i.e. an appreciable chemical reaction between the components does not take place at room temperature. Storage at low temperatures is not necessary.

The curable compositions may comprise fillers, adjuvants and additives common in epoxy resin techniques.

Possible fillers are for example: metal powder, wood flour, glass powder, glass beads, semi-metal and metal oxides such as $SiO_2$ (silica sand, silica flour, silanized silica flour, synthetic silica flour, silanized synthetic silica flour), aluminium oxide, titan oxide and zircon oxide, metal hydroxide such as $Mg(OH)_2$, $Al(OH)_3$, silanized $Al(OH)_3$ and AlO(OH), semi-metal and metal carbides (SiC and boron carbide), metal carbonates (dolomite, chalk, $CaCO_3$), metal sulfides (barite, gypsum), rock flour such as from hydromagnesite and huntite and natural or synthetic minerals mainly from the silicate row such as zeolites (in particular molecular sieves), talc, mica, kaloin, wollastonite and others.

Besides the above mentioned fillers, the curable mixtures may contain common adjuvants and additives such as antioxidants, e.g. sterically hindered phenols, flame retardants, fillers containing crystal water, diluents, colorants, pigments, fungicides, thixotropic and hydrophobic agents, viscosity enhancers, anti-foaming agents, antistatica, lubricants, anti-precipitation agents, wetting agents, flexibilizers, diluter and demoulding agents.

The inventive curable compositions may optionally further comprise inorganic and/or organic additives selected, for example, from flow control additives, antifoaming agents, anti-sag agents, pigments, reinforcing agents, fillers, elastomers, stabilizers, extenders, plasticizers, flame retardants, accelerators, colorants, fibrous substances, thixotropic agents, anti-corrosive pigments and solvents.

A preferred embodiment of the presently disclosed composition is a so-called 1.5 K system, where components (A) and (B) are mixed in the appropriate amounts and stored at room temperature. The addition of component (C) is performed shortly before application. This allows for extremely long pot-life combined with very fast curing at target temperature.

The selection of the adequate component (C) makes it possible to vary the pot-life in wide ranges from about 30 min to more than 4 months.

The curing of the presently disclosed compositions may be made by known manner. It takes place, in general, by heating the mixture to temperatures between 70° C. and 250° C., preferably between 100° C. and 180° C.

A further object of the invention is the cross-linked products obtainable by curing the disclosed compositions.

The epoxy resin composition and the cured material described herein can be used, for example, as coatings, adhesives, flooring materials, casting, tooling, impregnating or encapsulating resins.

Preferably, the inventive compositions are used for the production of adhesives, coatings or composites.

The Examples which follow serve to illustrate the presently disclosed compositions. In the Examples, "parts" are parts by weight and "percent" is percent by weight, unless indicated otherwise.

EXAMPLE 1

Synthesis of One-Component Mixture of bis(cyanoacetylaminomethyl)-tricyclo[5.2.1.0$^{2,6}$]decane+bisphenol A diglycidylether A glass reactor (500 ml) is charged with bis(aminomethyl)-tricyclo[5.2.1.0$^{2,6}$]decane (50 g, 0.26 mol). Ethyl cyanoacetate (61.12 g, 0.54 mol, 2.1 eq) is added to the stirred solution slowly over 30 min, taking care that the internal temperature never rises above 50° C. The mixture is stirred for 1 h at room temperature (RT). Then vacuum (ca. 80 mbar) is applied to remove the formed ethanol, while slowly raising the temperature to 80° C. over 30 min. The mixture is stirred at 80° C. for further 2 h. In order to ensure complete conversion, the mix is then heated to 100° C., still under vacuum, for 1 h. The amount of collected ethanol in the liquid nitrogen trap is measured. The mixture is allowed to cool to 80° C. and the vacuum is released. 294 g of the Araldite® GY 250 resin (bisphenol-A-diglycidyl ether from Huntsman Advanced Materials with average epoxy equivalent weight of 187) is added and the mix is kept at 80° C. under vacuum for 30 min, then cooled to 60° C. and deloaded from the reactor.

Final mix viscosity of the mixture at 50° C.=2.5 Pa s

EXAMPLE 2

Synthesis of One-Component Mixture of bis(cyanoacetylaminomethyl)tricyclo[5 2.1.0$^{2,6}$]decane+N,N,N',N'-tetraglycidyl-4,4'-diaminodiphenylmethane A glass reactor (500 ml) is charged with bis(aminomethyl)-tricyclo[5.2.1.0$^{2,6}$]decane (50 g, 0.26 mol). To the stirred solution ethyl cyanoacetate (61.12 g, 0.54 mol, 2.1 eq) is added slowly over 30 min, taking care that the internal temperature never rises above 50° C. The mixture is stirred for 1 h at RT. Then vacuum (ca. 80 mbar) is applied to remove the formed ethanol, while slowly raising the temperature to 80° C. over 30 min. The mix is stirred at 80° C. for 2 h. In order to ensure complete conversion, the mix is then heated to 100° C., still under vacuum for 1 hour. The amount of collected ethanol in the liquid nitrogen trap is measured. The mixture is allowed to cool to 80° C. and the vacuum is released. The resin (179 g of MY 721 resin from Huntsman Advanced Materials with an average epoxy equivalent weight of 114) is added and the mix is kept at 80° C. under vacuum for 30 min, then cooled to 60° C. and deloaded from the reactor.

Final mix viscosity of the mix at 80° C.=2.3 Pa s

EXAMPLE 3

Synthesis of DBU/Acetic Acid Salt

A round bottom flask is charged with acetic acid (6 g, 0.1 mol), THF (40 ml) and a stir bar and cooled with an ice bath. To the stirred solution 1,8-diazabicycloundec-7-ene (DBU) (15.2 g, 0.1 mol) is added via a syringe dropwise. The mixture is stirred for 2 h at RT and the THF is evaporated on a rotavapor to give the compound as a viscous oil.

EXAMPLE 4

Synthesis of DBU/$BF_3$ Salt

A round bottom flask is charged with DBU (15.2 g, 0.1 mol), THF (40 ml) and a magnetic stir bar and cooled with an ice bath. To the stirred solution, $BF_3$-etherate (14.2 g, 0.1 mol) is added via a syringe dropwise. The mixture is stirred for 2 hours at RT and the THF is evaporated on a rotavapor to give the compound as a white solid.

EXAMPLE 5

Curing of 1K Mixture with DBU/Acetic Acid Salt

The one-component mixture from Example 1 (~10 g) is heated at 40° C. in a glass reactor and DBU/acetic acid salt (0.173 g, about 2 mol-% with respect to number of epoxy groups) from Example 3 is added. The mixture is stirred at 40° C. under vacuum for 15 min and then poured in a mould. The mould is heated with the following curing schedule: 110° C. 30 min+140° C. 30 min and 170° C. 10 min to obtain a hard material with a glass transition temperature of ~155° C.

EXAMPLE 6

Curing of 1K Mixture with DBU/$BF_3$ Salt

The one component mixture from Example 1 (~10 g) is heated at 40° C. in a glass reactor and DBU/$BF_3$ salt (0.18 g, about 2 mol-% with respect to moles of epoxy groups) from Example 4 is added. The mixture is stirred at 40° C. under vacuum for 15 min and then poured in a mould. The mould is heated with the following curing schedule: 1 h/80° C., 1 h/140° C., 1 h/170° C. to obtain a hard material with a glass transition temperature of ~165° C.

EXAMPLE 7

Curing of 1K Mixture with an Imidazole Adduct Protected Base

The one component mixture from Example 1 (10 g) is heated at 40° C. in a glass reactor and the commercially available Aradur® 3123 hardener, 1-((2-Methyl-1H-imidazol-1-yl)methyl)naphthalen-2-ol, CAS Number: 185554-99-8 (0.19 g, 2 mol-% with respect to number of epoxy groups) is added. The mixture is stirred at 40° C. under vacuum for 15 min and then poured in a mould. The mould is heated with the following curing schedule: 110° C. 30 min+140° C. 30 min and 170° C. 10 min to obtain a hard material with a glass transition temperature of ~170° C.

EXAMPLE 8

Curing of 1K Mixture with an Asymmetric Urea Protected Base

The one component mixture from Example 1 (10 g) is heated at 40° C. in a glass reactor and the commercially available 1,1-(4-Methyl-m-phenylene)bis(3,3"-dimethylurea) (Dyhard UR 500, Alzchem), CAS Number: 17526-94-2(0.216 g, 2 mol-% with respect to number of epoxy groups) is added. The mixture is stirred at 40° C. under vacuum for 15 min and then poured in a mould. The mould is heated with the following curing schedule: 110° C. 30 min+140° C. 30 min and 170° C. 10 min to obtain a hard material with a glass transition temperature of 150° C.

EXAMPLE 9

Curing of 1K Mixture with a Polymeric Salt

The one component mixture from Example 1 (~8.3 g) is heated at 40° C. in a glass reactor and the commercially available Aradur® 1167 hardener (0.17 g, 2 wt-%) is added. The mixture is stirred at 40° C. under vacuum for 15 min and then poured in a mould. The mould is heated with the following curing schedule: 110° C. 30 min +140° C. 30 min and 170° C. 10 min to obtain a hard material with a glass transition temperature of ~120° C.

COMPARATIVE EXAMPLE 1

Curing of 1K Mixture with DBU as Unprotected Base

As described in Example 5, the one-component mixture from Example 1 (50 g) is heated at 40° C. in a glass reactor and DBU (0.63 g, about 2 mol-% with respect to number of epoxy groups) from Example 3 is added. The mixture is allowed to stir at 40° C. under vacuum for 15 min and then poured in a mould. The mould is heated with the following curing schedule: 110° C. 30 min+140° C. 30 min and 170° C. 10 min.

A hard material is obtained with a glass transition temperature of ~150° C.

The pot-lives of Examples 5-7 and the glass transition temperatures of the cured products are summarized in Table 1:

TABLE 1

| Example* | Catalyst | Pot life** | $T_g$*** |
|---|---|---|---|
| Comp. Ex. 1 | DBU | <30 min | 150° C. |
| Ex. 5 | DBU-Acetic Acid | >2 d | 155° C. |
| Ex. 6 | DBU-BF$_3$ | >6 months | 165° C. |
| Ex. 7 | 1-((2-Methyl-1H-imidazol-1-yl)methyl)naphthalen-2-ol | >10 d | 170° C. |
| Ex. 8 | Dyhard UR 500 | >3 months | 150° C. |
| Ex. 9 | Aradur ® 1167 | >12 months | 120° C. |

*Curing schedule for all samples: 110° C. 30 min + 140° C. 30 min and 170° C. 10 min except for DBU-BF$_3$ catalyst.
**Pot life is defined as the time taken for doubling the viscosity of the system at 23 ° C..
***Measured by DSC (scan rate 10° C./min) midpoint of transition.

All catalysts are used at 2 mol % loading with respect to the moles of epoxy groups except for Ex. 9 used at 2 wt %.

What is claimed is:

1. A curable composition comprising:
   (A) an epoxy resin containing on average more than one epoxy group per molecule;
   (B) a compound of formula A[—X—CO—CH$_2$—CN]$_n$       (1), wherein A is hydrogen or C$_1$-C$_{12}$ alkyl which is unsubstituted or substituted by one or more C$_1$-C$_{12}$ alkoxy groups, C$_1$-C$_{12}$ alkylcarbonyl groups, C$_7$-C$_{25}$ arylcarbonyl groups, hydroxyl groups, amino groups, C$_1$-C$_{12}$ alkylamino groups, dialkylamino groups with C$_1$-C$_{12}$ alkyls, cyano groups or halogen atoms or
   A is a bivalent aliphatic, cycloaliphatic, aromatic, araliphatic or heterocyclic organic radical, X denotes —O— or —NR$_1$— wherein R$_1$ is hydrogen or a C$_1$-C$_{12}$ alkyl which is unsubstituted or substituted by one or more C$_1$-C$_{12}$ alkoxy groups, C$_1$-C$_{12}$ alkylcarbonyl groups, C$_7$-C$_{25}$ arylcarbonyl groups, hydroxyl groups, amino groups, C$_1$-C$_{12}$ alkylamino groups, dialkylamino groups with C$_1$-C$_{12}$ alkyls, cyano groups or halogen atoms, and
   n is 1 or 2; and
   (C) a protected base in the form of an adduct or salt which is able to release a basic compound upon heating to a temperature greater than 70° C. wherein the protected base is selected from at least one of (i) a bronsted acid salt, a carboxylic acid salt, an epoxide adduct or a boron trihalide adduct of an aliphatic amine wherein the bronsted acid is selected from phenol, o-cresol, m-cresol, p-cresol, bisphenol A and bisphenol F, (ii) a phenol salt, a carboxylic acid salt, an epoxide adduct or a boron trihalide adduct of dicyandiamide, (iii) a bronsted acid salt, an epoxide adduct or a boron trihalide adduct of an imidazole wherein the bronsted acid is selected from phenol, o-cresol, m-cresol, p-cresol, bisphenol A and bisphenol F, (iv) a carboxylic acid salt, an epoxide adduct or a boron trihalide adduct of 1,8-diazabicycloundec-7-ene wherein the carboxylic acid salt is selected from the group consisting of an acetic acid salt, an ethylenediaminetetraacetic acid salt and a salicylic acid salt, (v) a phenol salt, a carboxylic acid salt, an epoxide adduct or a boron trihalide adduct of 1,5-diazabicyclo [4.3.0] non-5-ene, (vi) a phenol salt, a carboxylic acid salt, an epoxide adduct or a boron trihalide adduct of N'-(4-chlorophenyl)-N,N-dimethylurea or N'-(3,4-dichlorophenyl)-N,N-dimethylurea, and (vii) a 1H-imidazolium,3-ethyl-1-methyl-, salt with N-cyanocyanamide(1:1).

2. The curable composition according to claim 1 comprising as component (A) a bisphenol A diglycidylether or N,N,N',N'-tetraglycidyl-4,4'-diaminodiphenylmethane.

3. The curable composition according to claim 1 comprising as component (B) a compound of formula (1), wherein A represents 3-dimethylaminopropyl, cyclohexane-1,3-diyl, m-phenylene or a group of the formulae

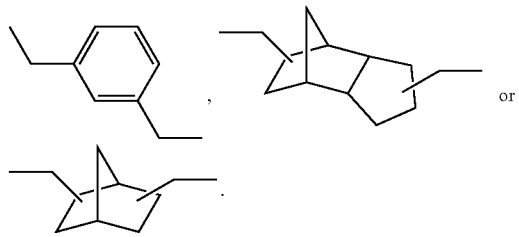

4. The curable composition according to claim 1 containing components (A) and (B) in such amounts that 0.1 mol to 10 mol —CO—CH$_2$—CN groups are present per mol epoxy groups.

5. The curable composition according to claim 1 containing component (C) in an amount of 0.001 mol to 0.1 mol per mol epoxy groups.

6. A process for the preparation of a cured article which comprises heating the composition according to claim 1 to a temperature of 100° C. to 250° C.

7. An adhesive comprising the composition of claim 1.

8. A coating comprising the composition of claim 1.

9. A casting comprising the composition of claim 1.

10. A composite material comprising the composition of claim 1.

* * * * *